May 8, 1934. E. E. FINEFROCK 1,957,998
VALVE
Filed Jan. 2, 1932   2 Sheets-Sheet 1

INVENTORS.
Emory E. Finefrock
William Watson
BY

ATTORNEYS.

May 8, 1934.　　　　E. E. FINEFROCK　　　1,957,998
VALVE
Filed Jan. 2, 1932　　　2 Sheets-Sheet 2

INVENTORS
Emory E. Finefrock
William Watson
BY
Lancaster, Allwine & Rommel
ATTORNEYS.

Patented May 8, 1934

1,957,998

UNITED STATES PATENT OFFICE 1,957,998

VALVE

Emory E. Finefrock and William Watson,
Oklahoma City, Okla.

Application January 2, 1932, Serial No. 584,522

4 Claims. (Cl. 251—144)

This invention relates to valves and more particularly to fluid valves well adapted for use in slush pumps and the like.

The primary object of the invention is to provide a valve equipped with a pair of faces and a pair of guide rods or stems, so that when one face becomes worn the valve can be turned about and the reverse face and reverse guide rod employed.

Another object is to provide a two-faced valve of the character described which is constructed of but three parts and is of very sturdy construction, since usually large valves on the water end of slush pumps are required in order to adapt them to use with thick muds which may at times carry gritty sand, and since the valves must be constructed in order to operate under high hydrostatic pressures.

Another object is to provide a valve having two faces of compressible material with the greater part of the material securely embedded within the valve structure, so that while the material itself is not removed and reversed, the valve with the material may be turned about, when one face is worn, and the fresh face employed.

Still another object is to provide a valve having the general construction just outlined, so that the repeated blows upon the compressible material, which occur in the ordinary operation of the device, will tend to assist in better holdings of material in place, rather than in loosening it from the valve structure.

Another object is to provide a valve of this kind adapted for use with valve seats and guide assemblies of various makes and models of slush pumps.

Other objects and advantages of this invention will be apparent during the course of the following detailed description.

In the accompanying drawings, forming a part of this specification, and wherein similar reference characters designate corresponding parts thruout the several views.

Figure 1:
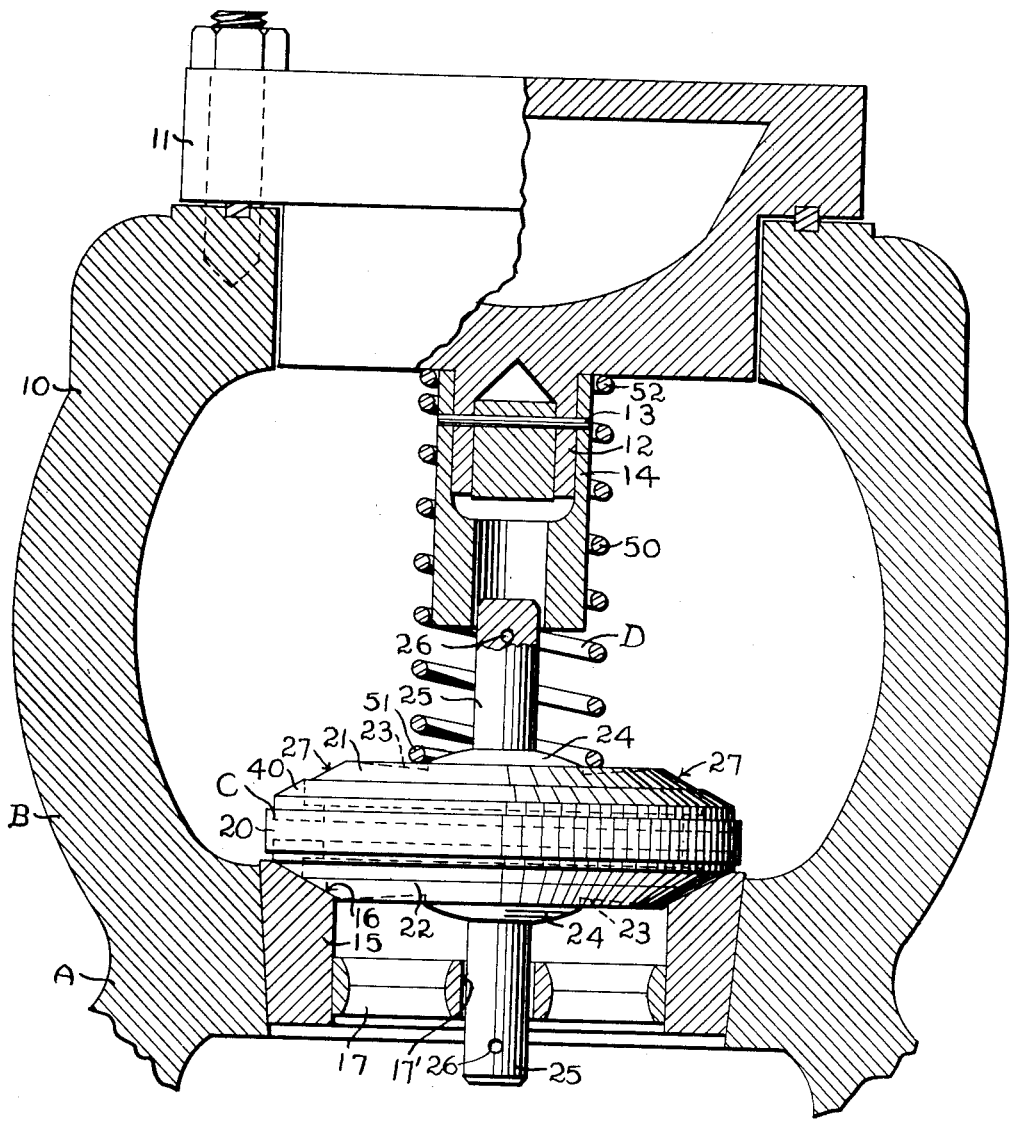
Figure 1 is a view partly in side elevation and partly in vertical section of the improved valve applied to the valve seat and adjacent parts of a slush pump.

In the drawings, wherein for the purpose of illustration is shown only a preferred embodiment of the invention, the letter A designates generally a valve assembly including a valve housing B, the improved valve C, and spring means D for the valve and housing, while the letters E, F and G designate generally, adapters for use with the improved valve and various valve housings.

The valve assembly A, insofar as housing B and spring means D are concerned, is a conventional water valve of a slush pump.

The valve housing B comprises a shell 10 usually forming part of the pump casting, having a removable valve cap 11 provided with an inwardly projecting axially positioned stub 12 to which is usually secured, as by a pin 13 a depending guide bearing 14 as shown in Figure 1. At the base of the valve housing is a valve seat 15 usually beveled as at 16 and below this seat is a spider 17 or similar device, provided with an axial opening 17′, axially aligning with the bearing 14 and this spider 17 provides a second guide bearing.

As for the improved valve C, the same comprises a disc-like body portion 20 having an outer circumference greater than the largest circumference of the valve seat, while the upper and lower faces 21 and 22 of the valve are each slightly dished as at 23 and provided with a raised frustoconical central portion 24 about the longitudinal axis of the body portion, serving as a spring abutment. From the center of each of the portions 24 projects a guide rod or valve stem 25, slightly beveled or rounded at their free ends. Preferably adjacent the free end of each guide rod 25 is a transverse perforation 26. It will be noted from the several figures that these guide rods are alike. Adjacent the periphery of the valve body, each face 21 and 22 is beveled as at 27, the degree of bevel being substantially that of the bevel 16 of the valve seat 15. The beveled portion of each face is provided with an annular groove 28, with parallel side walls, the innermost wall 28′ due to the bevel is much higher than the outermost wall 29, as may be seen from Figure 6 and since the body portion is preferably solid, this wall 28′ is strong and wide and cannot be bent due to hammering or the like when the valve is in use. The outermost wall 29 forms a ledge or rim about the valve body, the two opposite grooves 28 being separated from each other by an annular rib 30. Extending from each groove 28 is a recess 31 which projects at a right angle to the groove so that the two walls 32 and 33 of the recess parallel each other and extend towards the axis of the body portion and the end wall 34 is nearest the axis of said body portion. Thus it will be seen that a very definite recess 31 is provided at each groove 28, and this is important for the effective use of the valve. It is preferred that the width of the groove 28 plus the width of the recess 31 be approximately one-tenth of the diameter of the body portion and that the innermost wall 34 of a recess 31 be parallel to the outermost wall 29 of a groove 28.

Figure 3:
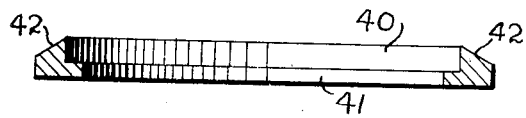
Figure 3 is a vertical section of an improved packing ring employed in the valve construction.

Each groove 28 and recess 31 is provided with an annular compressible packing ring 40 having a substantially L cross section, as shown in Figure 3. These rings fit snugly within their respective grooves 28 and recesses 31 with the flange or foot 41 of each ring within its respective recess. Each ring is provided with a beveled face 42 which normally projects above the beveled surface 27 of the body portion 20 and the angle of the bevel of each ring is not that of the angle of bevel of the main body portion as can be seen by the drawings, where it will be noted that the bevel of the ring is greater, with respect to the plane of the body portion 20. This is so that when the beveled surface 16 of the valve seat 15 and the beveled surface 42 of the ring 40 come into contact, there will be a slight undulation and the ring will be compressed towards the base of the groove and particularly towards the recess 31.

The main body portion 20 and guide rods 25 preferably form an integral portion, which may be of steel, while the ring 40 may be of rubber or the like. It will be noted that this assembly, to each side of the plane of the disc-like body portion, is the same so that the valve may be turned about and either beveled surface employed. It will also be noted that each ring 40 is the same but ordinarily, it is not intended that the rings be furnished the user of the valve, but rather that the reversible valve C as a whole be furnished.

The spring means D includes a conventional coil spring 50, one end 51 in contact with either of the abutments mentioned while the other end 52 is in contact with the inner end of the cap 11 with the spring encircling the bearing 14, forcing the valve to seat.

Since there are various makes of slush pumps on the market and since some of these are provided with different kinds of bearings corresponding to the bearing 13, the adapters E, F and G are provided. These adapters may be of steel, similar to the metal part of the valve C.

Figure 4:
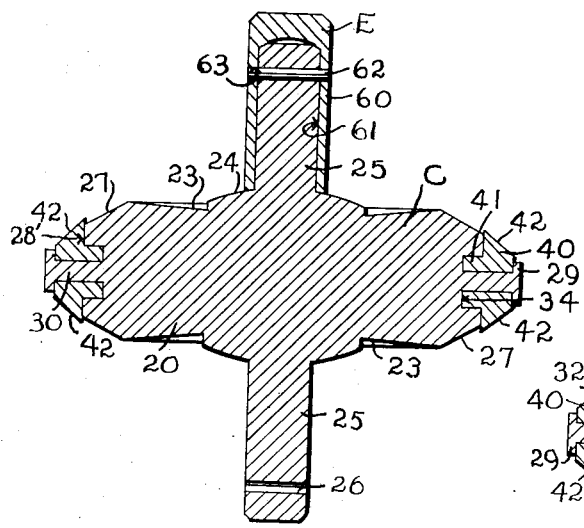
Figure 4 is a vertical section thru the improved valve, showing the same provided with an auxiliary guide stem or adapter, adapting it for use with a certain well known type of slush pump.

The adapter E shown in Figure 4 includes a short cylindrical body portion 60 provided with a socket 61 open at one end and adapted to enclose either rod 25 of the improved valve C, while a pin 62 or similar fastening means passes thru diametrically located holes 63 in the adapter and thru either of the holes or perforations 26 in the guide rods 25, removably securing the adapter to the valve.

Figure 5:
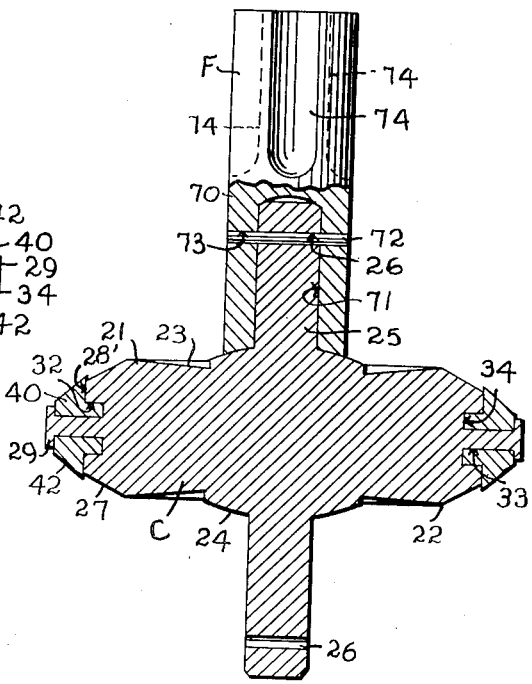
Figure 5 is a vertical section thru the improved valve provided with another type of auxiliary guide stem or adapter, adapting it for use with another well known type of slush pump.

The body 70 of the adapter F shown in Figure 5 is somewhat longer and of greater diameter than the adapter E, but is provided with a socket 71 like the socket 61 and holes 73 similar to the holes 63, thru which a pin 72 is inserted, coupling the adapter F by means of the holes in the valve C, to that valve. This adapter is preferably fluted as at 74.

Figure 6:
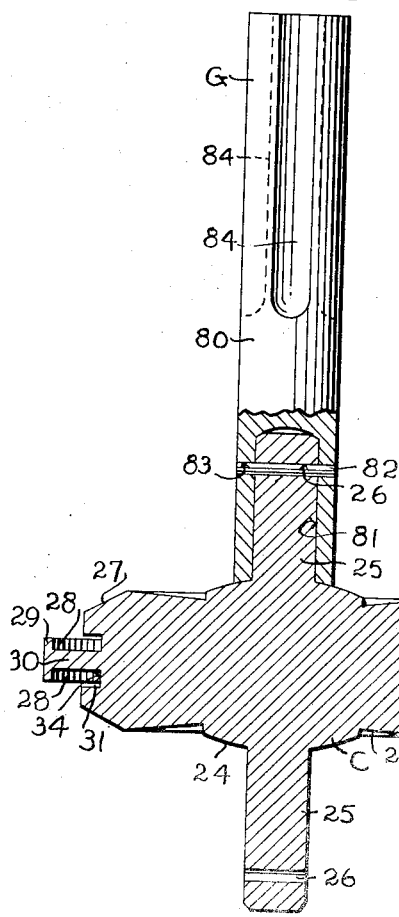
Figure 6 is a vertical sectional view thru the improved valve, without the packing rings, provided with still another auxiliary guide stem or adapter, so that it may be used with a third well known type of slush pump.
Figure 2:
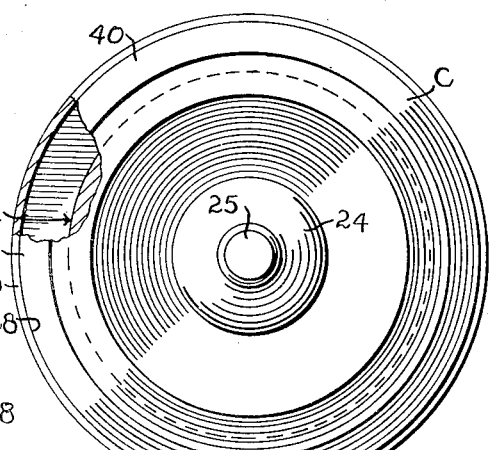
Figure 2 is a plan view of the improved valve, with a part broken away to better illustrate a portion of the construction.

As for the adapter G, the same comprises a long, slender body portion 80, provided with a socket 81 similar to the sockets 61 and 71 and holes 83 similar to holes 63 and 73. A pin 82 is provided to couple the adapter G to the valve C, as shown in Figure 6. This adapter is fluted as at 84.

From the above it may be seen that since each socket 61, 71 or 81 is alike and the holes 63, 73 and 83 similar in size and spacing from the inner end of each adapter, that either guide rod will be accommodated within any socket and may be coupled to any adapter.

In use, if it is desired to turn over the valve, employing its other face, the valve cap 11 is removed and the valve reversed. If an adapter is employed, the same is removed from what will be the lowermost guide rod and placed on what will be the uppermost one.

The shape of the pair of grooves and recesses and their walls are such that the packing ring will not be apt to mushroom over the beveled surface of the body portion 20 forming an imperfect face, and because of the solid sturdy construction, the impact of the valve on the seat will not force the inner wall of the body portion away from the packing ring.

The primary undulating of the surface of the ring, which will result as the surface of the ring is gradually coming into contact with the seat, due to the difference in degree of bevel, will force sand and grit off the seat and permit a tight seal. Impacts, rather than causing a loosening of the ring, will insure a more firm hold in the groove and recess as heretofore set out.

Various changes in the shape, size and arrangement of parts may be made to the form of invention herein shown and described, without departing from the spirit of the invention or the scope of the claims.

What is claimed is:

1. In a valve assembly, a housing provided with a pair of axial guide rod receiving openings and a beveled valve seat; and a reversible valve within the housing comprising a disc-like body portion provided with a pair of axial guide rods, slidable in said openings, said body portion having a pair of beveled surfaces adjacent the periphery thereof, like annular grooves extending into the body portion, one at each of said beveled surfaces, and like compressible packing rings in said grooves, each of said packing rings having surfaces for engagement with said seat beveled at angles different from the angles of bevel of the said surfaces of the body portion.

2. In a valve assembly, a housing provided with a valve seat and two oppositely disposed guide rod receiving openings with one of said openings larger in diameter than the other; a reversible valve within the housing, comprising a disc-like body provided with a valve seat engaging portion and a pair of axial guide rods; an adapter provided with a socket accommodating either of said guide rods, said adapter being slidable in the opening of larger diameter and either of said guide rods being slidable in the opening of smaller diameter; and means coupling the adapter to either guide rod.

3. In a valve assembly, a housing provided with a valve seat and two oppositely disposed guide rod receiving openings with one of said openings larger in diameter than the other; a reversible valve within the housing, comprising a disc-like body provided with a valve seat engaging portion and a pair of axial guide rods, each rod having a like transverse perforation; an adapter provided with a socket accommodating either of said guide rods, and also provided with diametrically disposed perforations communicating with the socket, and a coupling pin in the perforation of the rod accommodated in said socket and in said diametrically disposed perforations in the adapter, coupling said last mentioned rod to said adapter, said adapter slidable in said guide rod opening of larger diameter, and either of said guide rods slidable in the opposite guide rod opening.

4. In a valve assembly, a housing provided with a valve seat and two oppositely disposed guide rod receiving openings with one of said openings larger in diameter than the other; a reversible valve within the housing, comprising a disc-like body provided with a valve seat engaging portion and a pair of axial guide rods, each rod having a like transverse perforation; an adapter provided with a socket accommodating either of said guide rods, and also provided with diametrically disposed perforations communicating with the socket, and with flutings in its outer surface and a coupling pin in the perforation of the rod accommodated in said socket and in said diametrically disposed perforations in the adapter, coupling said last mentioned rod to said adapter, said adapter slidable in said guide rod opening of larger diameter, and either of said guide rods slidable in the opposite guide rod opening.

EMORY E. FINEFROCK.
WILLIAM WATSON.